Jan. 2, 1940.	H. METZLER	2,185,602
AUTOMATIC CHANGE-SPEED GEAR
Filed Nov. 11, 1936	8 Sheets—Sheet 1

Fig. 1.

Inventor.
Heinrich Metzler.
by
Raymond A. Robb
Attorney

Jan. 2, 1940. H. METZLER 2,185,602
AUTOMATIC CHANGE-SPEED GEAR
Filed Nov. 11, 1936 8 Sheets-Sheet 2

Inventor
Heinrich Metzler
By Raymond A. [signature]
Attorney

Inventor.
Heinrich Metzler.
By Raymond A. Roder
Attorney

Jan. 2, 1940. H. METZLER 2,185,602
AUTOMATIC CHANGE-SPEED GEAR
Filed Nov. 11, 1936   8 Sheets-Sheet 4

Inventor.
Heinrich Metzler
by
Raymond A. Robb
Attorney

Jan. 2, 1940.   H. METZLER   2,185,602
AUTOMATIC CHANGE-SPEED GEAR
Filed Nov. 11, 1936   8 Sheets-Sheet 5

Inventor.
Heinrich Metzler.
by
Raymond A. Robie
Attorney

Jan. 2, 1940.  H. METZLER  2,185,602
AUTOMATIC CHANGE-SPEED GEAR
Filed Nov. 11, 1936  8 Sheets-Sheet 7

Inventor
Heinrich Metzler
by
Raymond A. Robie
Attorney

Jan. 2, 1940.                H. METZLER                2,185,602
                    AUTOMATIC CHANGE-SPEED GEAR
                      Filed Nov. 11, 1936          8 Sheets-Sheet 8

Fig. 20.

Inventor.
Heinrich Metzler.
by
Raymond A. Robie
                Attorney

Patented Jan. 2, 1940

2,185,602

UNITED STATES PATENT OFFICE 2,185,602

AUTOMATIC CHANGE-SPEED GEAR

Heinrich Metzler, Feldkirch, Voralberg, Aus

Application November 11, 1936, Serial No. 110,2..
In Germany November 13, 1935

7 Claims. (Cl. 74—337)

The subject of this invention is a change-speed gear which automatically adjusts itself to a transmission ratio corresponding to the actual load and which can also be suitably engaged at will by a manual operation.

The present invention relates to a power transmission mechanism between a driving shaft and a driven shaft.

A preferred form of the invention is illustrated in the attached drawings, wherein:

Figure 5 is a view taken on line 5—5 of Figure 4a.

Figure 15 is a plan view of hand-shifting means.

Figure 1:
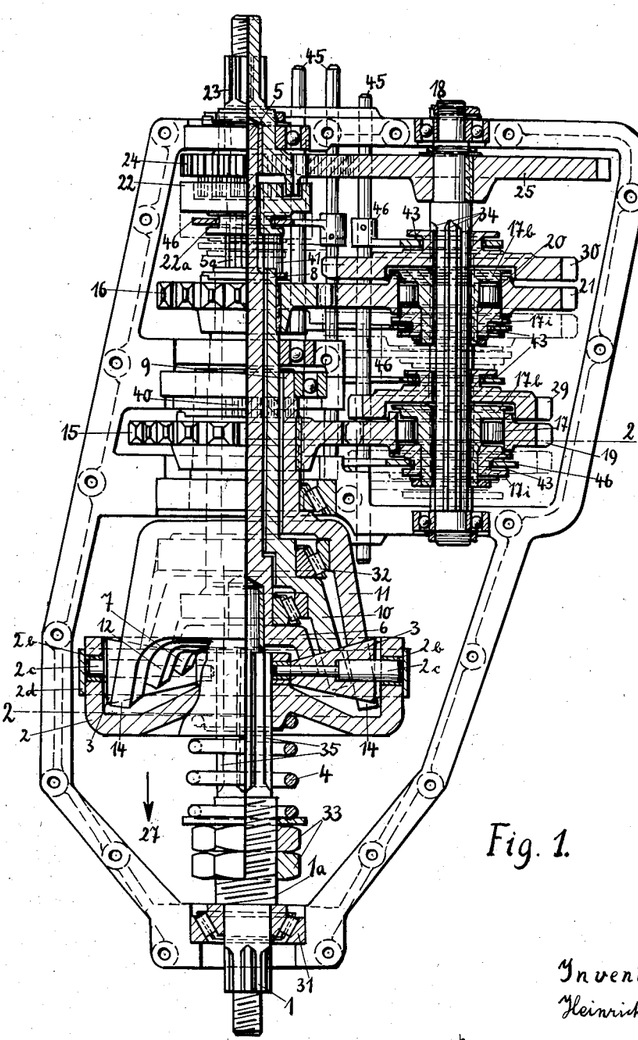
Figure 1 is a plan view of the invention seen from below and partly in section along line 1—1 of Figure 2.
Figure 2:
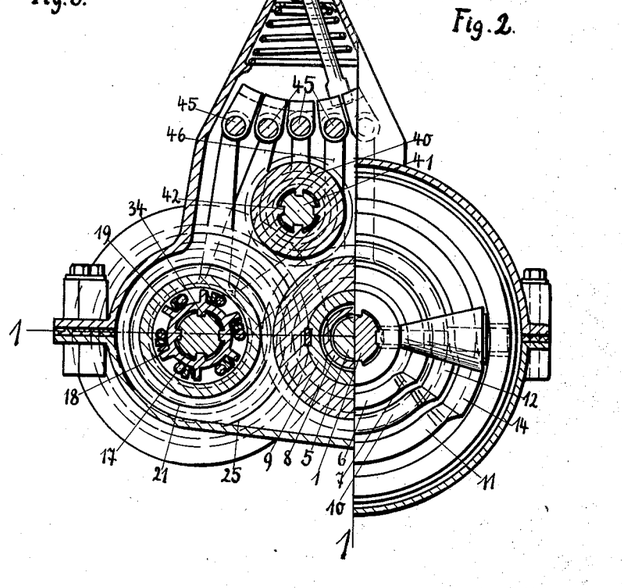
Figure 2 is a view turned 180° and is a section on line 2—2 of Figure 1.
Figure 20:
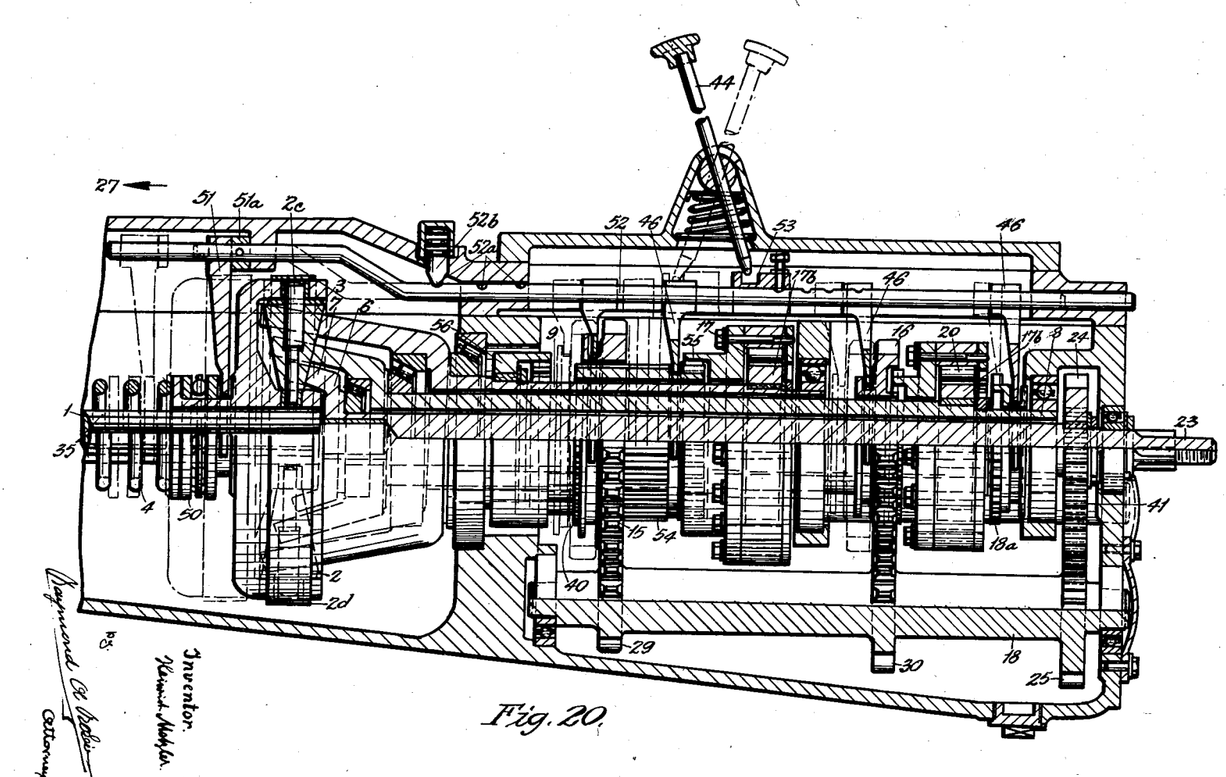
Figure 20 is an additional plan view of the device, in which different parts are arranged differently, as described in the text.

Referring first to Figures 1-3, 9-13, 16-20, the shaft 1 is intended to be connected with the part to be driven, for instance with the differential of a motor-vehicle drive wheels. The shaft 23 is meant to connect with the motive power source. The middle part of shaft 1 is provided with longitudinal grooves 35, provided in the circumference of the shaft, as shown in Figure 1 and Figure 20.

Figures 9, 10, 11, 12, 13, 14:
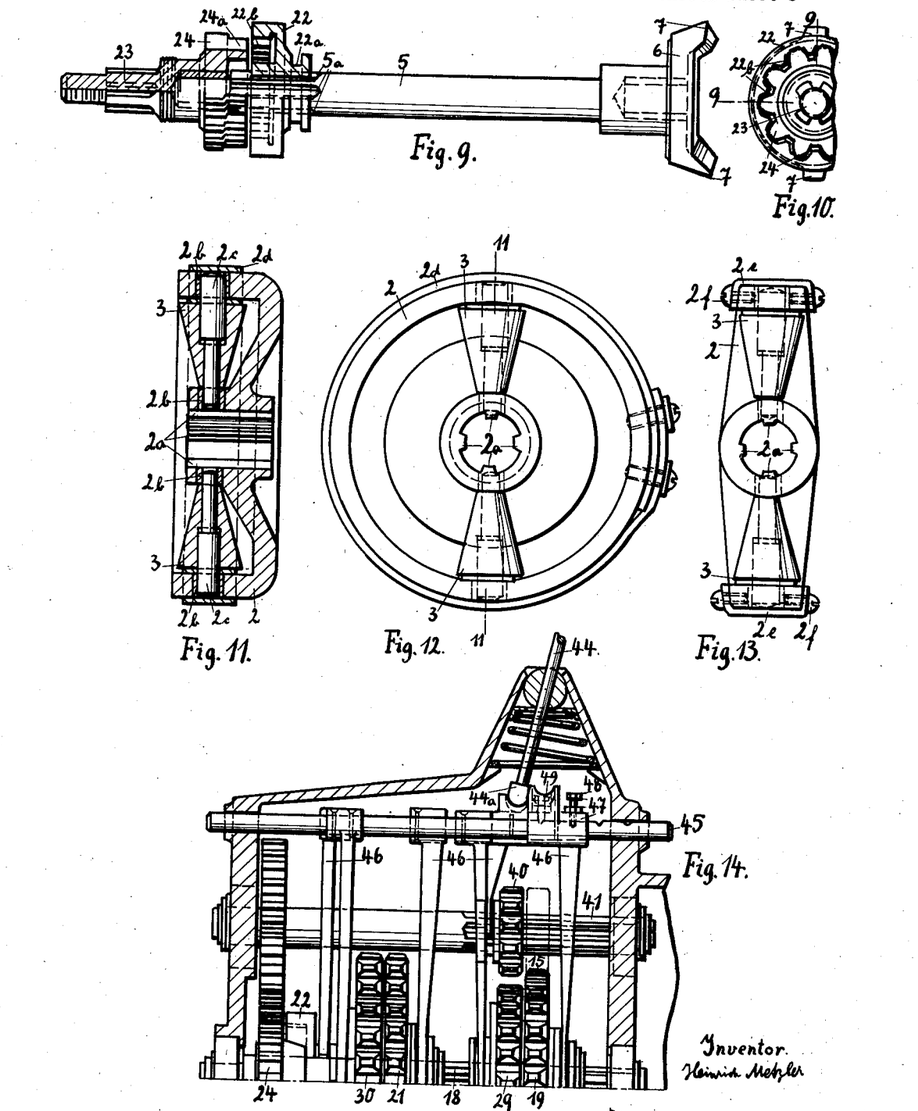
Figure 9 is a side elevational view along line 9—9 of Figure 10.
Figure 10 is a broken plan view of a detail represented in Figure 9, of that end which is turned towards the driven shaft of the machine.
Figure 11 is a sectional detail taken on line 11—11 of Figure 12.
Figure 12 shows a front view of a detail.
Figure 13 shows a front view of a detail.
Figure 14 is a cross-section of another detail for hand shifting.

Into these grooves 35 enter splines 2a provided in the middle of part 2. (Figs. 11, 12 and 13). Due to the fact that the splines 2a reach into the grooves 35, part 2 cannot be turned relative to the shaft 1, but can only be displaced in an axial direction thereon. In part 2, holes 2b have been provided radially and into which bolts 2c are slid. The bolts 2c penetrate into driver rollers 3, which, as for instance in Figures 1, 11, 12 and 13, are formed in the shape of conical cylinders. The rollers 3, as may be seen by looking at the drawings, are pivoted on bolts 2c and mounted to rotate in relation to part 2. In order to prevent the bolts 2c from flying out, as a result of centrifugal forces, a ribbon 2d has been fastened around part 2, as illustrated in Figures 1, 11, 12 and 20. The part 2 may be shaped in the form of a casing or drum as may be seen from Figures 1, 11, 12 and 20, or it may be formed as a double-lever, as seen from Figure 13. In the latter case, in order to secure the bolt 2c in place, bows 2e are fastened around the outer area of part 2. These bows are made of steel-sheeting or of some other suitable material and made fast by screws 2f or the like. The part of shaft 1 which lies behind that portion carrying the grooves 35 has been provided with a worm or thread 1a onto which nuts 33 have been threaded. Between the nuts 33 and the part 2, a spring 4 has been placed. Between shaft 1 and shaft 23, a shaft 5 has been made provision for (see Fig. 1). The end of shaft 5, which is nearest to shaft 1, is fitted with a concave disc 6 (see Fig. 9), having projections 7, pointing in the direction of the rollers 3.

Co-axial with the shaft 5 are hollow shafts 8 and 9 on the ends of which adjacent to the drivers are the concaved sleeve-like discs 10 and 11 which are likewise provided with tappet-like elevated portions 12 and 14. The elevated portions 12 extend beyond the elevated portions 7, and the elevated portions 14 extend beyond the elevated portions 12.

Secured on the hollow shaft 8 is a toothed wheel 15. Secured on the hollow shaft 9 is the toothed wheel 16. The toothed wheel 15 is in engagement with the toothed wheel 19 connected by way of a free wheel connection 17 with the intermediate shaft 18. The toothed wheel 16 engages the toothed wheel 21 connected by way of a free wheel connection 20 with the intermediate shaft 18.

Around the circumference of shaft 5, at the end which is nearest to shaft 23, splines 5a have been arranged along which a coupling member 22, splined thereon, can be slid axially. (See Figures 1, 9 and 10.) The changing of position of member 22 is done with a lever 46 which engages member 22 by means of a groove 22a with which the latter is provided. The manner in which this is done is to be described later on. The end of shaft 23 is provided with teeth 24, the reduced end 24a of which pointing towards 22 carries teeth which are smaller in height. On part 22 are inside teeth 22b which correspond to teeth 24a. If the member 22, from a position as illustrated in Figure 1, is pushed over or along part 24a, the inside teeth 22b engage or mesh into teeth 24a in such a way that through shaft 23 over 24 and 24a, part 22 and with it shaft 5 itself, is taken along. In Figure 9 part 22 is shown in such a position whereby there is no connection between shafts 23 and 5. The teeth 24 of shaft 23 are continuously engaging gear 25, the latter of which is fastened onto the intermediate shaft 18.

Figures 16, 17, 18, 19:
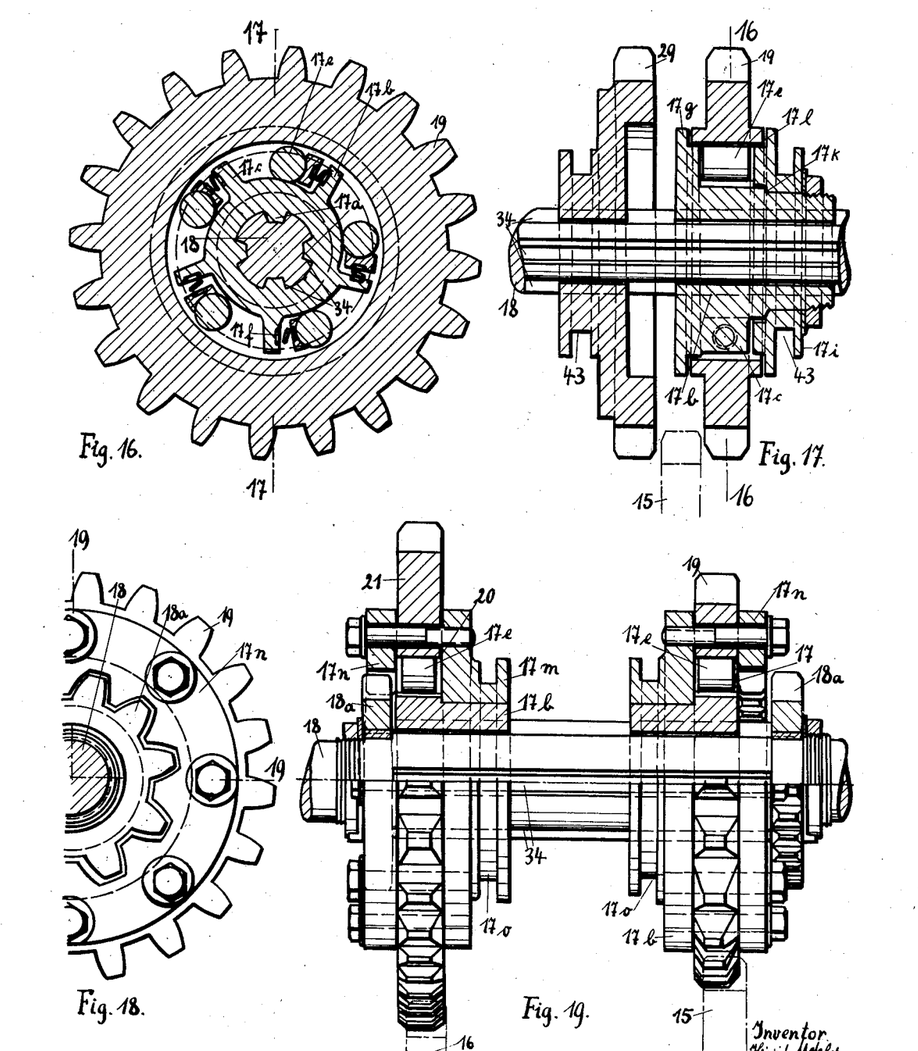
Figure 16 is a section of a detail taken on line 16—16 of Figure 17.
Figure 17 is a section of a detail on line 17—17 of Figure 16.
Figure 18 is a similar partial plan view.
Figure 19 shows two detail views arranged side by side, partially cut corresponding to line 19—19 of Figure 18.

The free-wheel connections 17 and 20, as shown in Figure 1, and in more detail in Figures 16 and 17, are connected with the intermediate shaft and the gears in the following manner:

The intermediate shaft 18 has splines 34 into which slide the teeth 17a of parts 17b, which are movable on shaft 18 in axial direction. The parts 17b are provided with a star-like sprocket having projections 17c which are all of the same height. The spaces 17d between each one of the projections 17c are in the form of an outward curvature (see Fig. 16 and Fig. 17), and in which a cylinder 17e has been placed which, by means of a spring-pressed part 17f can be urged towards the high-point of the curved area 17d.

The part 17b is provided with an enlargement 17g upon which the corresponding gears 19 and 21 respectively are mounted and around which they can turn. Upon the ends of parts 17b pointing towards the rollers 3, a collar 17i is mounted, having a circumferential groove 43 and secured by screws or the like. The part 17b is shouldered at point 17k against which the part 17i is pressed to leave the cylinders 17e free.

As a consequence of the positions of parts illustrated in Figure 1, the following automatic shifting positions can be had:

With a moderate load on the shaft 1 the drivers 3 and thus the parts 2 and 1 are entrained by the elevated portions 7. There is thus effected direct transmission of power, the disc extensions 10 and 11 of the hollow shafts being driven by the drivers engaging the elevated portions 12 and 14, the hollow shafts 8 and 9 and the toothed wheels 15 and 16 being rotated accordingly, the toothed wheels 15 and 16 rotating at the same speed as the shafts 1 and 5 and the toothed wheel 24. As the toothed wheel 24 is smaller than the toothed wheel 25 secured on the intermediate shaft 18, the intermediate shaft 18 rotates at a lower speed than the shafts 5 and 23. As in consequence of the transmission ratio, the toothed wheels 19 and 21 in engagement with the toothed wheels 15 and 16 rotate at a higher speed than the intermediate shaft 18, the free wheel connections 17 and 20 come into operation so that there is no transmission of power from the intermediate shaft to the more rapidly rotating toothed wheels 19 and 21.

If the load is increased, then in consequence of the inclination of the elevated portions 7, the drivers 3 are displaced in the direction of the arrow 27, overcoming the spring 4; the elevations 7 slide beneath the drivers 3 and the drivers now act on the next larger elevated portions 12. At this time the hollow shaft 8, the toothed wheel 16 secured thereon, and the toothed wheel 21 meshing with the toothed wheel 16 will be checked in consequence of the load on 1, 2 and 3, so that a connection is effected of the toothed wheel 21 by way of the free wheel connection 20 with the intermediate shaft 18, with the toothed wheel 25 secured on the latter, with the toothed wheel 24 meshing with the toothed wheel 25, and with the shaft stump 23 rigid with the toothed wheel 24. In consequence of the reduction ratio between the toothed wheels 24 and 25, the intermediate shaft 18 is rotated at a lower number of revolutions than the shaft stump. This lower number of revolutions is transmitted with a correspondingly increased torque from the elements 21, 16, 8, 10, 12, 3, 2 to the shaft 1, and the elevated portions 14 and thus the hollow shaft 9 and the toothed wheel 15 are driven at the same number of revolutions as the hollow shaft 8 is driven by the drivers 3. As the toothed wheel 15 is larger than the toothed wheel 19, and the latter is smaller than the toothed wheel 21, the toothed wheel 19 is speeded relatively to the intermediate shaft 18 so that the free wheel connection 17 interrupts the operative connection of the intermediate shaft 18 with the toothed wheel 19.

With further increased load the drivers slide along the inclines of the elevated portions 12, and are displaced further in the direction of the arrow 27, so that finally the elevated portions 12 slide beneath the drivers, and only the still larger elevated portions 14 act on the drivers 3. There is now effected checking of the hollow shaft 9 and of the toothed wheels 15 and 19, and connection is effected between the toothed wheel 19 by way of the free wheel connection 17 with the intermediate shaft 18 and by way of the intermediate shaft with the toothed wheels 25 and 24 and the shaft stump 23. The shaft 5 and the hollow shaft 8 now run at a higher speed than the hollow shaft 9, but these parts are no longer connected with the drivers 3 as the elevated portions 7 and 12 move freely beneath the drivers 3.

The pitch or the cam form of the elevated portions 7, 12 and 14 is such, or the tappet-like elevated portions 7, 12 and 14 are so bulged that, at the several transmission stages, the forces acting axially through the spring 4 on the drivers 3 balance the forces acting radially and caused by the load on the drivers 3, until the load for the stage actually in operation is so increased or diminished that by axial displacement of the drivers a changeover is effected to the next higher or the next lower stage.

The axial spring thrust is taken up by bearings 31 and 32 which are constructed to take up combined radial and axial thrusts, and may be formed for example as tapered roller bearings.

In order, instead of automatic changeover to be able to effect variation at will of the stages of transmission, as is desirable for example in the adaptation of the gearing to power vehicles, when coasting, with a steep inclined, the toothed wheels 19 and 20 provided with free wheel connections are arranged to be axially slidable on the intermediate shaft 18 in grooves 34, and beside each of these toothed wheels there is provided a toothed wheel 29 or 30 of the same size slidable in the same grooves 34 or the like, or the free wheel connections are adapted to be individually locked, i. e., rendered inoperative, so that the toothed wheels provided with the free wheel connections may be rigidly coupled with 18.

The blocking-device for the free-wheel connections can be executed according to Fig. 18 and 19, description of which follows:

Upon shaft 18 are mounted gears 18a which are securely fastened thereon. On shaft 18, longitudinal grooves 34 have also been provided, in which sliding, wedge-like grip member 17b are arranged to be shifted in axial direction. The gears 19 and 21 respectively are connected with part 17m which is freely journalled on 17b on one side, and with another part 17n, provided with inside teeth, on the other side, connection being made by screwing or some other suitable manner. The screw-pressure on parts 17m and 17n is therefore taken up by the gears 19 and 21, thereby leaving the free-wheel-cylinders 17e sufficient play in order to move between parts 17m and 17n. The parts 17m are provided with grooves 17o which run all around into which shifting members not shown in Fig. 19 may engage. If by means of the shifting members engaging in 17o, a shifting in axial direction has taken place, it follows that part 17m at the same time also takes part 17b along, because the starlike members 17c, of part 17b, are located in between the parts 17m and 17n. The free-wheels and the tooth-wheels 19 and 21 belonging thereto, may be moved in axial direction upon shaft by shifting members engaging into the grooves 17o in such a manner that the inside teeth of part 17n can be engaged with the outside teeth of part 18a, Fig. 19. In that case, the freewheel 20 belonging to gear 21 has been blocked. In case of a free-wheel being shifted with the gear belonging thereto, in axial direction, in whereby the inside gear 17n fastened to it no longer engages into gear 18a fastened on 18, the blocking of the free-wheel is suspended as seen in Fig. 19. In Fig. 19, the gears 15 and 16 have been indicated in broken-lines.

The free-wheel blocking may be executed also in such manner whereby part 17h is rigidly corrected with the shafts by wedging, screwing or the like and by which part 18a is arranged to move along the shaft, running in corresponding longitudinal grooves thereon as shown in Fig. 20 with free-wheel 20. The free-wheel 20 in Fig. 20 is mounted on the main shaft. The free-wheel is drawn in a position which is not blocked or free.

Figures 5, 15:
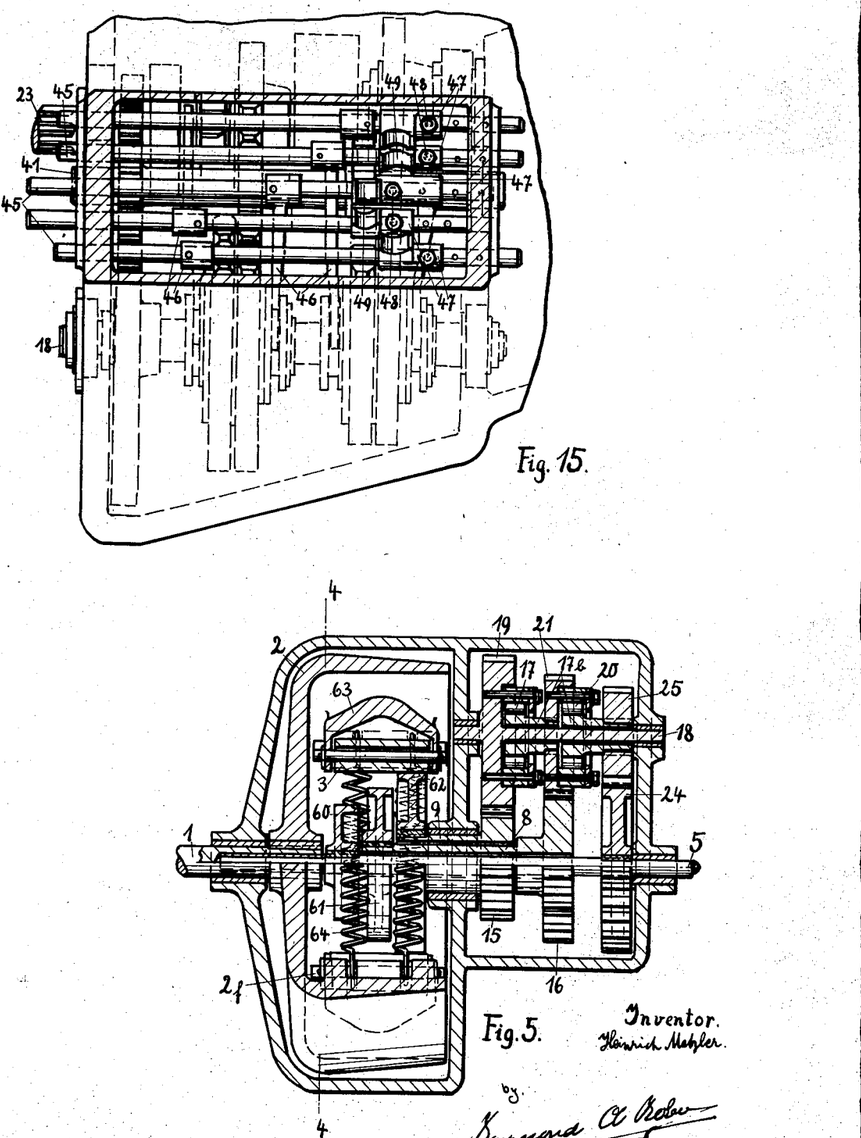

In order to displace the gears actuating the blocking action, namely: setting in motion, coupling 22, rods 45 have been arranged above the gears as shown in Figs. 1, 2, 14 and 15. Upon these rods, sleeves 47 have been fastened by screws 48 or in some other suitable manner, said sleeves carrying projections 49 which are hollowed out in the form of a half-circle. Into these hollowed elevations 49 engages the end 44a of a gear-lever 44, the latter of which, by means of ball-bearing joint, is set in a movable position. According to the movements imparted manually to the lever 44 radially with respect to the rods 45, said lever may engage into one or simultaneously two of projections 49. In the case of lever 44a engaging into one or two of the projections by swinging lever 44 in axial direction, the corresponding rod or rods are moved in axial direction also at the moment end of lever 44a engages therein. On rods 45, by means of pins or some other suitable manner, grip-members 46 have been fastened. As shown in Figs. 1 and 15 a rod 45 has been provided which can be moved in axial direction and belongs to gear 30 which is movable upon the intermediate shaft 18. An additional rod 45 has been provided which is for the coupling 22. An additional rod 45 has been provided also jointly for both gears 19 and 21 fitted with free-wheel connections. An additional rod 45 is provided for the gear 29 movable upon the intermediate shaft 18 and still another rod 45 is provided for the displacement of gear 40 upon another intermediate shaft 41.

If, for example, it is desired to change over from the automatic arrangement illustrated in Fig. 1 to maximum reduction (first speed), the toothed wheels 19 and 21 are so far displaced towards the drivers 3 that they are no longer in engagement with the toothed wheels 15 and 16 as indicated in Fig. 1 in broken lines, and the toothed wheel 29 is shifted in the same direction as the toothed wheel 19, so far that it comes into mesh with the toothed wheel 15, or the free wheel connection 17 is locked, and the toothed wheel 21 is so displaced that it is no longer in engagement with 16. Further, the clutch 22 is disengaged and the connection between the shaft 5 and the shaft stump 23 and toothed wheel 24 is interrupted. The transmission of power is now effected from the shaft stump 23 by way of the toothed wheels 24 and 25, by way of the intermediate shaft 18 and toothed wheel 29, or by way of the toothed wheel 19 provided with the locked free wheel connection, by way of the toothed wheel 15, the hollow shaft 9, extension 11, tappets 14, drivers 3 and carrier 2 to the shaft 1.

If change-over is to be effected manually to the intermediate reduction stage (second speed), the toothed wheels 19 and 21 are displaced as previously, so that they are no longer in engagement with 15 and 16; the toothed wheel 29 is again moved into the position it assumes for automatic gear change, so that it is no longer in engagement with 15, and the toothed wheel 30 is so displaced towards the drivers 3 that it comes into engagement with the toothed wheel 16—or the free wheel connection 20 is locked and the toothed wheel 19 is so shifted that it is no longer in engagement with the toothed wheel 15—and the clutch 22 is disengaged so that there is no connection between the shaft 5 and the shaft stump 23 and toothed wheel 24. The transmission of power is now effected from 23 by way of 24, 25, 18 and 30 or by way of 21, 16, 8, 10, 12, 3 and 2 to the shaft 1.

If there is to be effected direct transmission (third speed) by manual operation, the toothed wheels 29 and 30 remain in the position shown in Fig. 1, but the toothed wheels 19 and 21 are shifted towards the drivers 3, so that they are no longer in mesh with 15 and 16, and the clutch 22 is again engaged so that 5 is connected with 23 and 24.

If free wheel running is desired, the toothed wheels on the intermediate shaft are displaced as for direct transmission, and the clutch 22 is disengaged, so that the shaft 5 is disconnected from 23 and 24.

If reverse drive is to be effected, the gearing is set for free wheel running and then one of the toothed wheels 40, of which one is fixedly mounted on an intermediate shaft 41 and is continuously in mesh in 25, and of which the other is axially slidable in the grooves 42 or the like on the intermediate shaft 41, is so shifted that it engages the toothed wheel 15.

Figure 3:
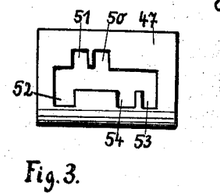
Figure 3 is a detail of a so-called gate.

The shift of the toothed wheels and the operation of the clutch 22 are effected in known manner by means of grooved hubs 43 which are engaged by the intermediate pieces 46 connected with rods 45 adapted to be slid in axial direction by a change-speed lever 44. When the shift is effected according to a scheme as shown in Fig. 3 with a gate 47 provided to facilitate manual operation, the displacement of the toothed wheels necessary for each stage or the operation of the clutch can be effected by means of a single actuation of the lever 44 in this wise that, when the lever 44 engages the notch 50, the gearing is set for automatic operation, two of the rods 45, namely, one for disengaging the clutch 22 and one for shifting the respective toothed wheels being adapted to be displaced by the lever 44; that when the lever 44 engages the notch 51 the gearing is set for direct power transmission; when the lever 44 engages the notch 52, the gearing is set for second speed; and when the lever 44 engages the notch 53, the gearing is set for maximum reduction. When the lever 44 engages the notch 54, the gearing is set for reverse drive. When the lever 44 is not in engagement with any of the notches, free wheel running is provided for, it being understood that changeover from one stage to another is effected with an intermediate free wheel stage.

As illustrated in Fig. 20, the carrier 2 of drivenmember can be provided with an axial-pressure-bearing 50 onto which a lever 51 connects which in turn is connected by a system of rods 52 and a sleeve 53 fastened thereon with the gear-lever 44 itself. The lever 51 engages in between the thrust bearing 50 and the cylinder-carrier 2 with its forked end in such a way that upon lever 44 being moved towards position indicated in broken lines parts 53, 52, 51, and 50 are displaced, the carrier of moving member is lifted up and across the projections 7, 12, and 14, finally reaching the position indicated in broken lines in Fig. 20. In order that the carrier of moving members remain alone in the position in which it has been brought by the actuation of lever 44, notches 52a have been provided on rod 52 into which a spring-pressed bolt 52b may snap. The pressure of the spring exerted upon part 52b, as well as the pitch of the end of the bolt itself are balanced in such a way that the power or force of spring 4 may not lift bolt 52b out from one of the notches 52a. However, if the force of spring 4 is supported by a corresponding axial swaying of lever 44, part 52b shall now be pressed out from notches 52a. However if the driving-mechanism is desired to work automatically, which means an automatic displacement of the carrier of the driving-member 2 by the load, and also the force of spring 4 being used, without axial movement of the carrier 2 by parts 52 and 52b being interfered with, lever 51 is rendered movable in axial direction on rod 52 and there is, as shown in Fig. 20, behind lever 51 a block-ring 51a connected with part 52 by pins or some other suitable means, disposed in such a way whereby upon actuation by hand lever 51 is displaced by the block-ring 51a in the direction in which the arrow 27 of Fig. 20 points.

Furthermore the free-wheels may be mounted on the main shaft itself and in that case the member 17b belonging to free-wheel 20 is rigidly connected with the hollow snaft 8, whereas the other member 17b, belonging to free-wheel 17 is rigidly connected with the hollow shaft 9. Again, the free-wheels in Fig. 20 are blockable as disclosed above, whereby the member 18a belonging to free-wheel 20 is axially movable upon the end part of hollow shaft 8 which is grooved and whereby of free-wheel 17, the inside teeth are provided on the extension 55 which is on the other side of member 17b. In order to separate the gear 15 from free-wheel 17 when in reverse, simultaneously connecting with shaft 9 displaced towards the roller 3, such as indicated in broken lines in Fig. 20, a toothed shell 54 has been provided, disposed between hollow shaft 9 and gear 15, said shell being axially and freely movable on hollow shaft 9 having teeth on its outer surface. These teeth shall be engaged with an inside-toothed ring 56 fastened to hollow shaft 9, effecting by corresponding axial displacement an engagement therewith. This arrangement requires no separate shaft 5 but it may, as seen distinctly from Fig. 20, have the shaft 23 go through the center of shaft 8 and the disc 6 with its projections 7 carried by shaft 23 direct.

In this case: For automatic change the position remains unaltered as shown in Fig. 20; for change at will to maximum reduction (first speed) the part 2 is so shifted in the direction of the arrow 27 that the drivers 3 engage only the elevated portions 14 and the free wheel connection 17 is locked; for change at will to second speed the part 2 is so displaced that the drivers 3 engage only the elevated portions 12 and 14, the free wheel 20 is locked and the toothed wheel 15 is so shifted that it is no longer in engagement with 16; for change at will to direct power transmission the part 2 is brought to Fig. 20 position so that the drivers engage the elevated portions 7, 12 and 14 and the toothed wheels 15 and 16 are so shifted that they are no longer in engagement with 29 or 30; for free wheel running the part 2 is shifted in the direction of the arrow 27, so that the drivers 3 engage none of the elevated portions 7, 12 and 14; for reverse drive the part 2 is so shifted that the drivers 3 engage only the elevated portions 14 and the toothed wheels 15 and 16 are so shifted that they are no longer in engagement with 29 or 30 and one toothed wheel 40 is brought into engagement with 15.

Figure 4A:
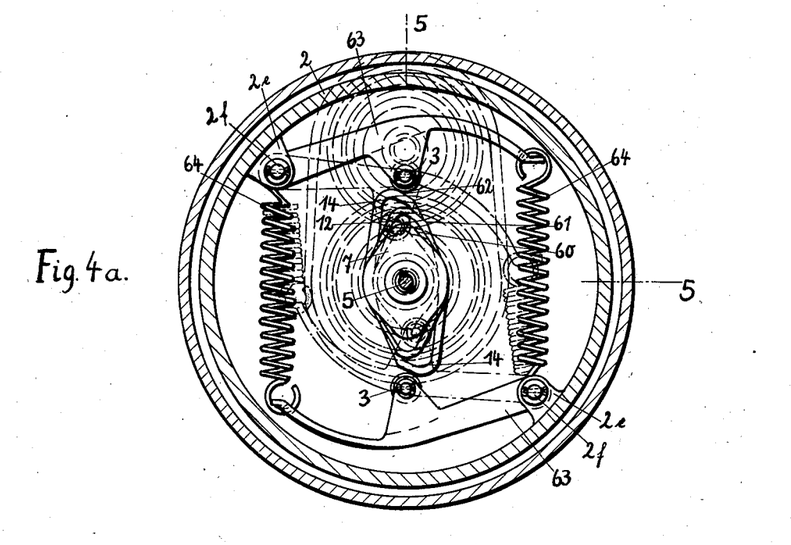
Figure 4a shows an arrangement for a low number of revolutions, at maximum load, and is taken on line 4—4 of Figure 5.

The cams or tappet-like elevated portions 7, 12 and 14, may, as shown in Figs. 4, 4a and 5, be provided on discs 60, 61, 62 secured respectively on the shaft 5, hollow shaft 8 and hollow shaft 9, in which case the drivers 3 acting on the elevated portions or cams will be mounted rockably on rock levers 63 pivoted to the carrier 2 fitted on the shaft 1, and the drivers will be subject to the pressure or tension of springs 64 acting on the rock levers 63. In Fig. 5 the toothed wheels 15, 16, 24, 19, 21 and 25 are shown arranged in reverse order and size ratio to that of Fig. 1, the shaft 1 being assumed to be coupled with the driving motor and the shaft 5 with the driven mechanism. The devices for effecting variation at will of the transmission ratio are omitted from the diagrammatic showing of Figs. 4, 4a and 5, the drivers 3 being shown in full lines in the position at maximum load at Fig. 4a and in dotted lines in their position for direct power transmission.

In the first instance it should be remarked that in Fig. 5, hollow-shaft 8 and tooth-wheel 16 as well as hollow-shaft 9 and tooth-wheel 15 are drawn as being made of one piece, furthermore that the discs 60, 61 and 62 are shown as being wedged on to shafts 5, 8 and 9 and that the shaft 18 has been formed as one piece together with gear 19. The free-wheel connections upon the intermediate shaft are illustrated in Fig. 5 in such a way, whereby the free-wheel-parts 17b appear to be freely journalled upon shaft 18 and that the part 17b, belonging to free-wheel 17, appears to be rigidly connected with tooth-wheel 21 as well as part 17b belonging to free-wheel 20 appears to be rigidly connected with gear 25. Furthermore in Figs. 4a and 4b, there have been drawn two bored projections 2e attached to part 2, in the boring of which a bolt 2f is secured. On to these bolts 2f are fastened the pivoted levers 63 and springs 64 hooked on to said bolts 2f, as distinctly indicated in Figs. 4a, 4b and 5.

The function in that case is exactly as has been described for Fig. 1 and as a matter of fact upon starting, and when under heavy load, at first shaft 5 remains stationary with relation to shaft 1, calculated in that case to be connected with the motor when same starts moving at a slower pace than shaft 1. Prior to starting, that is to say in unloaded condition, the levers 63 formed as cylinder-carriers, the rollers 3 attached to it and the springs 64 stay in a position as indicated in Fig. 4a in broken lines. As soon as the load begins to affect the driven shaft 5, the rollers 3 slide along the circumference of discs 60, 61 and 62 whereby the springs 64 are brought under tension until the cylinders find themselves above the outer edges 12 of disc 61 and reach the location of curve 14 of disc 62. The pitch of parts of curve 14 is so great that the normal momentum of rotation of the motor is sufficient in order to overcome the tension of the spring 64 whereby at a corresponding load on the driven shaft, the drivers remain over the curved areas 14 and may only be pressed down towards the middle-shaft if the load is lessened by the aid of springs 64 away from areas 14. As long as the large starting load persists, disc 62 is taken along by rollers 3 and thereby, the rotary movement, by way of hollow-shaft 9 on to the small gear 15 and from here to the large intermediate shaft gear 19 by way of free-wheel 17 to 21, free wheel 20 to gear 25 and, finally, gear 24 engaging into 25, is transferred to shaft 5. It must be mentioned that the free-wheels are constructed in such a way that they function as free-wheels only, that is: free-wheel 17 transfers no motion from 19 upon 21 and free-wheel 20 no motion from 21 upon 25, only in case when the gear 25 is ahead of gear 21, if the wheel 21 runs ahead of wheel 19. If the device holds the position as shown in Fig. 4a and there occur in this case loads which represent maximum traction or any other load impulses whatsoever, the rollers 3 may not slide over surface 14 beyond disc 62 because, as may be seen in Fig. 4a, levers 63, even if they are only pressed to a small degree by surfaces 14 towards the outside, hit against the inside-wall of casing 2. In the loaded position, represented in Fig. 4a, shaft 5 turns as a consequence of the transmission of the gears having a low ratio of revolution with a high power ratio. Thereby discs 60 and 61 rotate more rapidly than disc 62 but without touching the rollers 3 at all because they rotate freely below the rollers close to surface 14, also because their highest curved surfaces 7 and 12 are closer to the middle shaft than the surface 14.

Figure 4B:
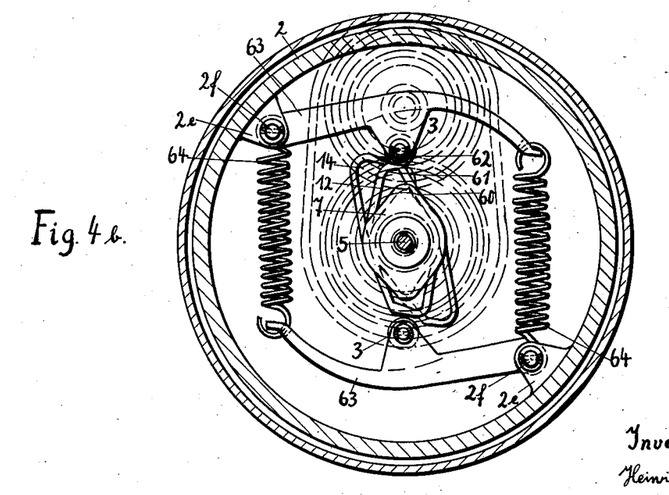
Figure 4b is a view similar to above but at medium load.

In case of the load on the driven shaft growing smaller, levers 63 and therefore rollers 3 are swayed by springs 64 towards the centre-shaft and they firstly engage the slanting surfaces 12 of disc 61. The surfaces 12 are pitched to such a degree that the load corresponding to the second speed coming off the driven shaft is sufficient in order to surmount the force of springs 64. The positions held by parts 63, 3 and 64 at medium load, is represented in Fig. 4b. In that case the rotary movement of part 2 by way of parts 63, 3, 61, 8, 16, 21, 20, 17b, 25, 24 is transferred to shaft 5. The disc 62, in that case, is also carried along by rollers 3 and the rotary movement is transferred from part 9 unto gears 15 and 19. However, on account of gear 21 in that case rotating more rapidly than gear 19, the effect of free-wheeling is released in free-wheel 17 whereby the connection between the gears 21 and 19 is released. The rollers 3 are thereby not in contact with the disc 60 because the surfaces 12 are further distant from the centre-point than the highest points 7 of disc 60.

If the load drops still further the rollers at last begin to grip disc 60 whereby direct transmission upon shaft 5 takes place and the gear 25 rotates more rapidly than 21 and in turn rotates more rapidly than 19, whereby by way of the free-wheels 17 and 20, the connection between gears 19, 21 and 25 is released.

Figure 6:
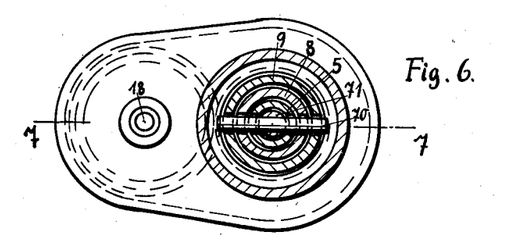
Fig. 6 is a section on the line 6—6 of Fig. 7 showing an arrangement for low torque transmission.
Figures 7, 8:
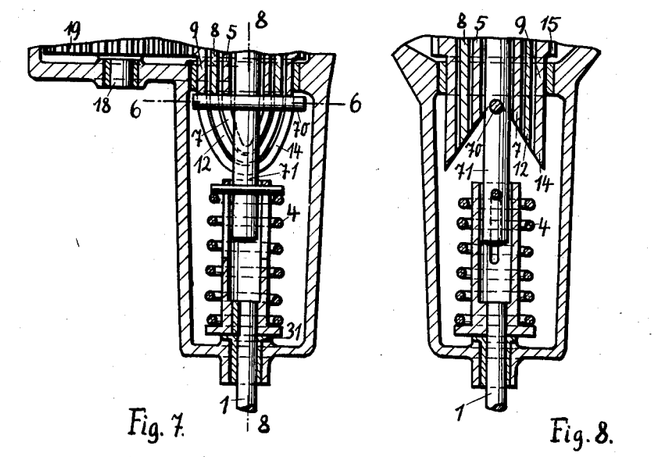
Fig. 7 is a longitudinal section on the line 7—7 of Fig. 6.
Fig. 8 is a section on the line 8—8 of Fig. 7.

The cams or elevated portions 7, 12, 14 may also, as shown in Figs. 6, 7 and 8, be fitted directly to the hollow shafts 8 and 9 or to the shaft 5 having a hollow extension, so that the shafts appear as sleeves the ends of which are provided with open slots, the tappet-like projections or cams being acted on by a pin 70 serving as a driver and secured to an axially movable shaft 71 subject to the thrust of the spring 4.

The effect of the driver-bolt 70 opposite to the surfaces 7, 12 and 14, as well as opposite to the tooth gears and free-wheels, is in that case equal to that of roller 3 of Figs. 1, 4a, 4b, and 5, description of which is given above.

In correspondence with the number of stages of transmission there will be a number of cam discs or sleeves, hollow shafts, etc., so that the gearing constructed according to the principle explained above can be produced with any desired number of transmission stages.

It must be understood that various changes as to size, shape and arrangement of the parts can be effectuated without departing from the spirit of the invention or the scope of the annexed claims.

What I claim as my invention and desire to secure by Letters Patent of the United States is:

1. In an automatic change-speed gear having free-wheeling between the transmission speeds, a rotating cam face associated with each speed, each of said cam faces being concentrically disposed with respect to the others and load-connected drivers jointly spring urged against said cam faces, the cam faces' highest point projecting in each position beyond the cam face of the next higher speed, the steepness of said cam faces being such as to balance the spring effort influencing the drivers for any given load-transmission ratio.

2. In an automatic change-speed gear having free-wheeling between the transmission speeds, a plurality of concentrically nested cams having peaked faces, one of said cams being associated with each of the transmission speeds, a load connected shaft, an axially movable casing slidable on said shaft, conical drivers mounted radially in said casing and adapted to be progressively engaged by the faces of the cams according to the load on the shaft, and adjustable spring means for urging the drivers against the cams, the faces of said last being such that the load corresponding to the actual transmission ratio the spring effort influencing the drivers' position is balanced.

3. In an automatic change-speed gear transmission a load-connected shaft, a driving shaft, a plurality of concentrically nested hollow shafts corresponding in number to the transmission stages, concentrically nested discs provided at one end of the nested hollow shafts and having peaked cam faces, transmission gears mounted on nested hollow said shafts, means for imparting movements to said gears from the driving shaft, a casing slidable on the load-connected shaft, conical drivers radially mounted in said casing, a spring urging the casing and drivers against the cam faces of the discs, and means for adjusting the tension of the spring.

4. In an automatic change-speed gear as claimed in claim 3, free-wheeling means inserted in the transmission stages, an intermediate shaft supporting said free-wheeling means in meshing arrangement with the transmission gears, a gear for imparting a reduced rotary movement to the intermediate shaft from the driving shaft, a disengageable clutch on the driving shaft, means for locking the free-wheeling means, and fork means for slidably displacing the transmission gears axially on the intermediate shaft, whereby manual shifting of the gears can be effectuated at will independently of the automatic means by manipulation of a conventional shifting lever co-operating with said fork means.

5. In an automatic change speed transmission, a driven load-connected shaft, a plurality of concentrically aligned shafts co-axial with the driven shaft, a cup-shaped peaked cam at the load end of each shaft, said cams being concentrically nested one within the other and having faces increasing in steepness from the innermost cam to the outermost one, a drum axially slidable on the driven shaft and splined thereto, conical drivers radially secured to said drum for contacting with the cam faces, an adjustable spring urging the drum and drivers against the cams, a gear connected to the other end of each shaft except the innermost one, a countershaft parallel to the shafts, gears on said countershaft meshing with the gears of the shafts, free-wheeling units between the countershaft and each of its gears, a driving shaft geared to said countershaft, and a clutch for effectuating direct drive between said driving shaft and the inner central shaft.

6. An automatic gear transmission, comprising driving and driven shafts, a countershaft, gearing between the driving shaft and said countershaft, whereby said last is continuously driven by the driving shaft, a plurality of shafts concentrically disposed with respect to each other and each protruding from within the next outer shaft, a gear on the free end of each shaft except the central one, corresponding gears on the countershaft meshing with the shaft gears, free-wheelings associated with the countershaft gears, a cam face at the other end of each concentric shaft, conical drivers bearing on the cam surfaces, a spring pressed drum for carrying the drivers and connected to the driven shaft, and a clutch between the central concentric shaft and the driving shaft.

7. In an automatic gear transmission having a driving shaft geared to a countershaft, said countershaft including speed reducing gears provided with free-wheelings, a plurality of shafts concentrically nested and having one end provided with a gear meshing with one of the countershaft gears, a cup-shaped cam at the other end of each concentric shaft, said cams being concentrically disposed with respect to each other, spring pressed means adapted to successively press against said cams according to the load to be transmitted through the transmission, a load-connected driven shaft connected to the spring-pressed means, and a clutch for connecting said inner shaft to the driving shaft.

HEINRICH METZLER.